US005777024A

United States Patent [19]

Killilea et al.

[11] Patent Number: 5,777,024
[45] Date of Patent: Jul. 7, 1998

[54] URETHANE RESINS AND COATING COMPOSITIONS AND METHODS FOR THEIR USE

[75] Inventors: T. Howard Killilea, Brooklyn Park; Donald W. Boespflug, Lino Lakes; Paul H. Stenson, Plymouth, all of Minn.

[73] Assignee: The Valspar Corporation, Minneapolis, Minn.

[21] Appl. No.: 846,758

[22] Filed: Apr. 30, 1997

[51] Int. Cl.$^6$ ............... C08J 3/00; C08K 3/20; C08L 75/00; C07D 251/00
[52] U.S. Cl. ............... 524/590; 427/372.2; 427/385.5; 524/589; 525/123; 525/455; 526/301; 528/73; 528/75; 544/222
[58] Field of Search ............... 544/222; 524/589, 524/590; 525/123, 455; 528/73, 75; 526/301; 427/385.5, 372.2

[56] References Cited

U.S. PATENT DOCUMENTS

| | | | |
|---|---|---|---|
| 4,013,806 | 3/1977 | Volkert et al. | 427/54 |
| 4,128,537 | 12/1978 | Markiewitz | 544/222 |
| 4,239,866 | 12/1980 | Reitel et al. | 525/440 |
| 4,297,185 | 10/1981 | Chevreux et al. | 204/159.15 |
| 4,355,077 | 10/1982 | Chevreux et al. | 428/412 |
| 4,480,094 | 10/1984 | Hagiwara et al. | 544/222 |
| 4,485,226 | 11/1984 | Noll et al. | 528/45 |
| 4,870,152 | 9/1989 | Meixner et al. | 528/49 |
| 5,043,410 | 8/1991 | Re et al. | 528/70 |
| 5,053,317 | 10/1991 | Joerg et al. | 430/281 |
| 5,068,305 | 11/1991 | Meixner et al. | 528/49 |
| 5,300,586 | 4/1994 | Bening et al. | 525/332.8 |
| 5,360,873 | 11/1994 | Ohkawa et al. | 525/193 |
| 5,409,764 | 4/1995 | Otsuki et al. | 428/221 |

OTHER PUBLICATIONS

Abstract of Japanese Patent Document No. JP 61042529 (1986).

*Primary Examiner*—Patrick D. Niland
*Attorney, Agent, or Firm*—Merchant, Gould, Smith, Edell, Welter & Schmidt, P.A.

[57] ABSTRACT

An allophanate-modified urethane resin is formed by reacting an allophanate-modified isocyanurate with one or more hydroxy-functional olefinic compounds, such as hydroxy-functional acrylates, methacrylates, allyl ethers, or vinyl ethers. Such resins typically have relatively low viscosities and can be used to make coating compositions for surfaces such as wood, cement, vinyl, plastic, metal, and glass on such diverse products as flooring, vinyl tiles and sheets, fiber optics, and plastic. Such coating compositions are typically curable by thermal processes or by high-energy irradiation, including UV/visible light or electron beam irradiation.

27 Claims, No Drawings

URETHANE RESINS AND COATING COMPOSITIONS AND METHODS FOR THEIR USE

BACKGROUND OF THE INVENTION

Compounds having olefinic bonds have been used in a variety of coating compositions that, when cured, give a hard, durable coating. One class of compounds having olefinic bonds with demonstrated usefulness in the formulation of coating compositions are olefinic urethane resins derived from the reaction of polyisocyanates with hydroxy-functional olefinic compounds, such as hydroxy-functional acrylates, methacrylates, allyl ethers, and vinyl ethers. These urethane resins can typically be crosslinked to each other or to other compounds, such as (meth)acrylate or other olefinic monomers, to generate hard coatings for a variety of surfaces including wood, cement, vinyl, metal, glass, and plastic. Such coatings can often achieve greater durability and abrasion resistance than other conventional coatings.

Many olefinic urethane resins with good durability and/or abrasion resistance have high viscosity. Such resins are typically formulated with a diluent so that the resin-containing coating composition can be applied by standard techniques, such as spraying, painting, rollcoating, spin coating, and dipping, which typically require that the coating composition have a relatively low viscosity for application.

The diluent generally includes one or more organic compounds, such as (meth)acrylate or other olefinic monomers, which may be crosslinked with the resin. The use of diluent containing crosslinkable compounds can reduce advantageous features imparted by the urethane resin, such as hardness, durability, and abrasion resistance. In some cases, the crosslinkable compounds may provide additional advantages, such as stain resistance. However, even in these cases, it is usually desirable to minimize the amount of crosslinkable diluent, consistent with the desired properties, to enhance the durability and abrasion resistance of the coating.

SUMMARY OF THE INVENTION

The present invention is directed to allophanate-modified urethane resins and coatings made using these resins. One embodiment of the invention is an allophanate-modified urethane resin that includes a compound having the following formula:

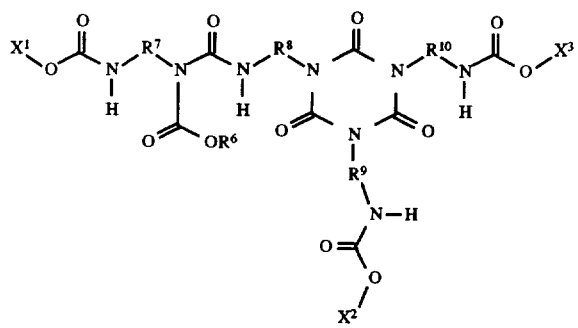

where $X^1$, $X^2$, $X^3$ are independently $-(R^1-O)_n-R^2-(O-R^3)_p-$, $-(R^4-C(O)-O)_m-R^5-(O-R^{11})_r$, and/or $-CH_2-C(R^{12})=CHR^{13}$; $R^1$, $R^2$, $R^4$, and $R^5$ are independently C2–C12 alkylene; $R^3$ and $R^{11}$ are independently $-C(R^{14})=CHR^{15}$, $-CH_2-C(R^{16})=CHR^{17}$, and/or $-C(O)-C(R^{18})=CHR^{19}$; $R^6$ is C1–C8 alkyl or C3–C8 cycloalkyl; $R^7$, $R^8$, $R^9$, and $R^{10}$ are independently C2–C12 alkylene; $R^{12}$, $R^{13}$, $R^{14}$, $R^{15}$, $R^{16}$, $R^{17}$, $R^{18}$, and $R^{19}$ are independently H or C1–C4 alkyl; n is an integer from 0 to 12; m is an integer from 1 to 4; p is an integer from 1 to 3; and r is an integer from 1 to 3.

One method for making such resins includes the reaction of an allophanate-modified isocyanurate with one or more hydroxy-functional olefinic compounds, such as allyl alcohol and hydroxy-functional (meth)acrylates, allyl ethers, and/or vinyl ethers.

Another embodiment of the invention provides a curable coating composition including the resin. The resin may optionally include (meth)acrylate or other olefinic monomer material for crosslinking with the resin, a photoinitiator to enhance the UV-curability of the resin; other urethane, epoxy, and/or polyester (meth)acrylate resins to enhance properties of the coating composition; and/or one or more other performance enhancing additives, such as an adhesion promoter, a surface active agent, a filler, a pigment, or an optical brightner.

Another aspect of the invention is directed to a method of coating a surface of a substrate. The present curable coating composition can be applied to the surface of the substrate to form an uncured coated surface. Once applied, the uncured coated surface can be cured by irradiation, such as with ultraviolet light or an electron beam, to produce a cured coating on the surface.

DETAILED DESCRIPTION OF THE PREFERRED EMBODIMENT

The allophanate-modified urethane resins of the present invention are useful in producing coating compositions for a wide variety of applications. Allophanate-modified urethane resins are typically generated by reacting an allophanate-modified isocyanurate with a hydroxy-functional olefinic compound, such as a allyl alcohol and/or hydroxy-functional (meth)acrylate, allyl ether, and/or vinyl ether.

Useful coating compositions are made by crosslinking the allophanate-modified urethane resin with itself and/or an optional (meth)acrylate monomer material. The allophanate-modified urethane resins often have a relatively low viscosity, thereby allowing higher resin loadings in useful coating compositions. The coating compositions may also contain other components such as a photoinitiator, other urethane, epoxy, and/or polyester (meth)acrylate resins, an adhesion promoter, a defoamer, pigment, a solvent, a surface active agent, a curing indicator, and/or a filler. The resulting coating compositions typically have one or more of the following characteristics: toughness, durability, hardness, abrasion-resistance, and stain resistance. Such compositions are useful for coating many types of surfaces including wood, cement, vinyl tile, sheet vinyl, metal, plastic, glass, optical fibers, and fiberglass, and can be used on such diverse products as floors, fiber optics, and automobile headlights.

For the purposes of this invention, the term "(meth) acrylate" refers to an ester which includes a functional group having the following general formula:

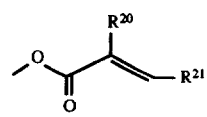

where $R^{20}$ and $R^{21}$ are H or lower alkyl (i.e., C1–C6 alkyl). Preferably, $R^{20}$ and $R^{21}$ are H or C1–C4 alkyl and, more preferably. $R^{20}$ is H or $CH_3$ and $R^{21}$ is H. Thus, the term "(meth)acrylate" includes both acrylate and methacrylate groups and a variety of related alkyl substituted analogs of acrylic acid. In addition, the term "alkyl", for purposes of this invention, refers to both straight-chain and branched alkyls.

The urethane resin of the present invention includes a compound having the following general structure, based on an allophanate-modified isocyanurate:

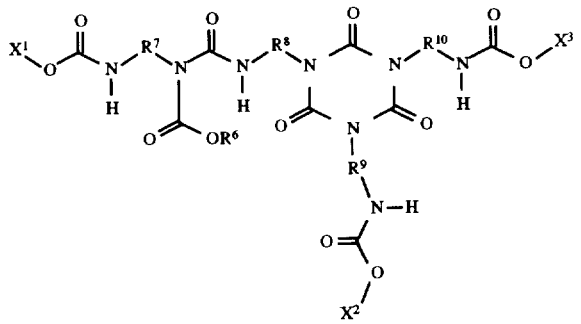

where $X^1$, $X^2$, $X^3$ are independently $-(R^1-O)_n-R^2-(O-R^3)_p-$,$-(R^4-C(O)-O)_m-R^5-(O-R^{11})_r$, and/or $-CH_2-C(R^{12})=CHR^{13}$; $R^1$, $R^2$, $R^4$, and $R^5$ are independently C2-C12 alkylene; $R^3$ and $R^{11}$ are independently $-C(R^{14})=CHR^{15}$, $-CH_2-C(R^{16})=CHR^{17}$, and/or $-C(O)-C(R^{18})=CHR^{19}$; $R^6$ is C1-C8 alkyl or C3-C8 cycloalkyl; $R^7$, $R^8$, $R^9$, and $R^{10}$ are independently C2-C12 alkylene; $R^{12}$, $R^{13}$, $R^{14}$, $R^{15}$, $R^{16}$, $R^{17}$, $R^{18}$, and $R^{19}$ are independently H or C1-C4 alkyl; n is an integer from 0 to 12; m is an integer from 1 to 4; p is an integer from 1 to 3; and r is an integer from 1 to 3. Each of these groups, as well as n, m, p, and r, are independent and may be the same as or different from other similarly labeled groups.

$R^{12}$, $R^{14}$, $R^{16}$, and $R^{18}$ are preferably H or $CH_3$. $R^{13}$, $R^{15}$, $R^{17}$, and $R^{19}$ are preferably H. $R^6$ is preferably C3-C5 alkyl. $R^7$, $R^8$, $R^9$, and $R^{10}$ are preferably C4-C8 alkyl and m is preferably 1 or 2. In one embodiment of the invention, $X^1$, $X^2$, and $X^3$ all include the same type of olefinic group, e.g., all three include an allyl ether. In another embodiment, $X^1$, $X^2$, and $X^3$ are the same.

In a further embodiment, $R^2$ and $R^5$ are independently $-CH_2CH_2-$, $-CH_2CH_2CH_2-$, $-CH(CH_3)CH_2-$, or $-CH_2CH_2CH_2CH_2-$. $R^2$ and $R^5$ are preferably $-CH_2CH_2-$ or $-CH(CH_3)CH_2-$. Allophanate-modified urethane resins with these functional groups can be generated using readily available commercial olefinic compounds.

One method of generating the resin is the reaction of an allophanate-modified isocyanurate with one or more hydroxy-functional olefinic compounds, such as hydroxy-functional (meth)acrylates, allyl ethers, and vinyl ethers. Suitable allophanate-modified isocyanurates for use in making allophanate-modified urethane resins include those having the following general formula:

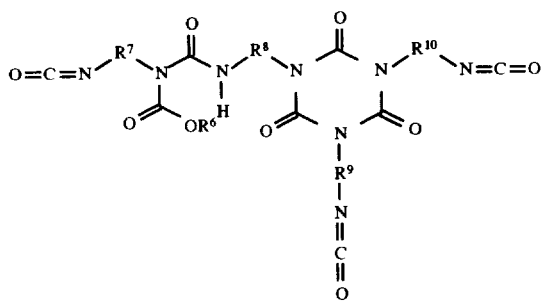

where $R^6$ is C1-C8 alkyl or C3-C8 cycloalkyl; $R^7$, $R^8$, $R^9$, and $R^{10}$ are independently C2-C12 alkylene and preferably C4-C8 alkylene. Examples of commercial allophanate-modified isocyanurates include Desmodur XP-7040 and Desmodur XP-7100, both available from Bayer Corporation (Pittsburgh, Pa). Desmodur XP-7040 and Desmodur XP-7100 are believed to be allophanated isocyanurate trimers, derived from hexamethylene diisocyanate (HDI), (i.e., $R^7$, $R^8$, $R^9$, and $R^{10}$ are $-(CH_2)_6-$). Desmodur XP-7040 and XP-7100, although theoretically trifunctional, have a functionality believed to be between about 2.2 and 3.2. The actual functionality is thought to be due to the reaction of the allophanate-modified isocyanurate with an alcohol ("$R^6OH$"). In particular, XP-7100 is thought to have a functionality between about 2.7 and 3.2 and XP-7040 is thought to have a functionality between about 2.4 and 2.7.

The term "functionality", when used in reference to the allophanate-modified isocyanurate, means the average number of isocyanate groups per molecule of the allophanate-modified isocyanurate. The functionality can be determined by a combination of Gel Permeation Chromatography (to determine the molecular weight distribution of the allophanate-modified isocyanurate) and a method for measuring the weight percent of isocyanate groups in the allophanate-modified isocyanurate. Typically, suitable allophanate-modified isocyanurates have a functionality of at least about 2.2. Preferably, the functionality is less than about 3.2.

As used herein, the term "functionality", when used in reference to the allophanate-modified urethane resin, mean the average number of olefinic groups per molecule of the allophanate-modified urethane resin. It is believed that the functionality of the allophanate-modified urethane resin will be the same or nearly the same as the functionality of the allophanate-modified isocyanurate from which the resin is derived.

Suitable hydroxy-functional olefinic compounds for reaction with the allophanate-modified isocyanurate includ hydroxy-functional (meth)acrylates. Examples of suitable alkyl and cycloalkyl hydroxy-functional (meth)acrylate include 2-hydroxyethyl (meth)acrylates, 3-hydroxypropyl (meth)acrylates, 4-hydroxybutyl (meth)acrylates 2-hydroxy-2-methylethyl (meth)acrylates, an 4-hydroxycyclohexyl (meth)acrylates, as well as other sim lar hydroxy-functional aliphatic (meth)acrylates. Other sui able hydroxy-functional (meth)acrylates include hydroxy functional (meth)acrylate polyesters, such as caprolacton 2-((meth)acryloyloxy)ethyl esters (HO—$(CH_2)_5$—C(O)—O—$CH_2CH_2O$—C(O)—$CHCH_2$), dicaprolactone 2-((meth acryloyloxy)ethyl esters (HO—$((CH_2)_5$—C(O)—$O)_2$-$CH_2CH_2O$—C(O)—$CHCH_2$), and higher molecular weigh caprolactone homologues, as well as hydroxy-function (meth)acrylate polyethers, such as((2-hydroxy-1-methy ethoxy)ethyl (meth)acrylates. Preferred hydroxy-function (meth)acrylates include 2-hydroxyethyl acrylate, 3-hydroxypropyl acrylate, 2-hydroxy-2-methylethyl acrylate, caprolactone 2-(acryloyloxy)ethyl ester, and dicaprolactone 2-(acryloyloxy)ethyl ester (available as Tone M-100 from Union Carbide).

Another type of hydroxy-functional olefinic compound for use in generating an allophanate-modified urethane resin is a hydroxy-functional allyl ether. The hydroxy-functional allyl ether includes at least one hydroxyl group and one or more allyl ether groups. Examples of suitable hydroxy-functional allyl ethers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like.

Methallyl ethers, such as trimethylolpropane dimethallyl ether, may also be employed. In addition, the allyl ether may be propoxylated or ethoxylated. Moreover, allyl alcohol can be reacted with the allophanate-modified isocyanurate to generate an allophanate-modified urethane resin.

Although the allyl ether may contain more than one hydroxyl group, the preferred allyl ethers for use in generating an allophanate-modified urethane resin have a single hydroxyl group. The use of hydroxy-functional allyl ethers having more than one hydroxyl group, and particularly the use of a substantial amount of such ethers, may result in increased viscosity of the resin.

Vinyl ethers may also be reacted with the allophanate-modified isocyanurate to generate the present allophanate-modified urethane resin. The vinyl ether compound includes at least one hydroxyl group and one or more vinyl ether groups. Examples of suitable vinyl ethers include 4-hydroxybutyl vinyl ether, cyclohexanedimethanol monovinyl ether, ethylene glycol monovinyl ether, diethylene glycol monovinyl ether, and the like. In addition, ethoxylated and propoxylated compounds of this type may also be used.

The reaction occurs between the allophanate-modified isocyanurate and olefinic reactant material which contains one or more hydroxy-functional olefinic compounds, (e.g., allyl alcohol and the (meth)acrylates, allyl ethers, and vinyl ethers described hereinabove). This reaction is typically carried out by mixing the components at an elevated temperature between about 40° C. and 120° C., preferably between about 50° C. and 100° C. Because the reaction is exothermic, the olefinic reactant material may be added slowly to a reaction vessel containing the allophanate-modified isocyanurate to control the temperature of the reaction. Preferably, the olefinic reactant material are added to the reaction vessel over a period of about 0 to about 4 hours, more preferably about 0.5 to about 3 hours, and most preferably about 1 to about 2 hours.

Often a catalyst is added to accelerate the reaction and minimize competing reactions. Suitable catalysts include tin catalysts such as dibutyl tin dilaurate and tin dioctoate, as well as, alkali metal alcoholates, such as sodium ethylate, and tertiary amines, such as triethylamine, diethylene triamine, or dimethyl benzylamine.

An aerobic inhibitor, such as a methoxyphenol, is often added to the reaction mixture to hinder reactions between the generated free-radicals and olefinic functional species. Such inhibitors need oxygen to function properly and so the addition reaction is typically conducted under an oxygen-containing atmosphere (e.g., air).

Once all of the olefinic reactant material has been added, the temperature may be raised slightly to increase the speed of the reaction. Typically, the reaction is allowed to continue until the level of free isocyanate is less than about 1%, preferably less than about 0.5%, and more preferably less than about 0.1%. The level of free isocyanate may be determined by titration. One useful titration method includes the addition of an amine solution to an aliquot of the reaction mixture. Amines react with free isocyanate groups. The amine-containing aliquot is titrated with acid to determine the residual amount of free amine, which is then compared to the amount of free amine in the amine solution, and thereby ascertaining the amount of free isocyanate in the aliquot.

Because the reaction typically goes to or near completion, the allophanate-modified isocyanurate and the olefinic reactant material are often added in an equivalent ratio of approximately 1:1. This equivalent ratio is defined as the ratio of the number of isocyanate groups in the allophanate-modified isocyanurate reactant material to the number of hydroxyl groups in the olefinic reactant material. A slight excess of either reactant, preferably the olefinic reactant material, may be used to increase the reaction rate. Preferably, the equivalent ratio of isocyanate groups to hydroxyl groups is about 0.9:1.0 to about 1.1:1.0. More preferably, the equivalent ratio is at least about 0.95:1.0 and most preferably between about 0.95:1.0 to about 0.99:1.0 (i.e., the addition reaction is conducted with a slight excess of hydroxyl groups with respect to the total number of isocyanate groups).

The resulting allophanate-modified urethane resins tend to have a lower viscosity than resins obtained by a similar reaction between an unmodified isocyanurate (i.e., an isocyanurate without allophanate-modification) and the same olefinic reactant material. Such low viscosity resins are especially useful in coating compositions because, for a given coating viscosity, a higher load of resin can be accommodated in the composition, thereby providing or increasing desirable properties of the coating composition.

Although no particular theory with respect to the invention is asserted herein, the low viscosity of allophanate-modified urethane resins is thought to be due, in part, to molecular asymmetry introduced by allophanation of the isocyanurate. In addition, it is thought that there is a decrease in the strength of hydrogen bonding between urethane linkages due to the presence of the allophanate functional group.

The viscosity of the allophanate-modified resins typically varies with the degree of allophanation of the allophanate-modified isocyanurate. The allophanate-modified isocyanurate is often characterized as a mono-allophanate, i.e., the product of the reaction of an isocyanurate with one alcohol molecule and one diisocyanate molecule. However, commercial grades of allophanate-modified isocyanurates typically include varying amounts of unmodified and di- and tri-allophanated isocyanurates. The presence of these molecules will affect the average molecular weight of the resin and, therefore, its viscosity. Typically, the allophanate-modified isocyanurate will include a higher weight percentage of mono-allophanated material than either unmodified or poly-allophanated material. Preferably, the allophanate-modified isocyanurate will include greater than about 60% mono-allophanated material.

In addition, resins having longer "arms" (i.e., substituents) extending from the isocyanurate ring will typically have lower viscosity. The length of the arms will depend on the diisocyanate(s) (OCN—$R^8$—NCO, OCN—

$R^9$—NCO, and OCN—$R^{10}$—NCO) used to generate the isocyanurate. Preferably, $R^8$, $R^9$, and $R^{10}$ are C4–C8 alkylene.

The length of the arms also depends on the length and type of the hydroxy-functional olefinic compounds which are reacted with the allophanate-modified isocyanurate to form the resin. Preferably, $X^1$, $X^2$, and $X^3$ have between 3 and about 34 atoms in their backbones. More preferably, $X^1$, $X^2$, and $X^3$ have between about 8 and about 25 atoms in their backbones.

The relative viscosity among different allophanate-modified urethane resins is influenced by the degree of functionality of the isocyanurate precursor and the resulting resin. Typically, the lower the functionality, the lower the viscosity of the resin and coating compositions made using the resin. However, lower functionality will often result in less crosslinking when the resin is used in a coating composition, as described in detail hereinbelow, and may affect the properties of the cured coating.

The viscosity of the allophanate-modified urethane resins will often be less than about 65,000 centipoise at 25° C. Typically, the allophanate-modified urethane resins most useful for coating compositions have a viscosity of less than about 40,000 centipoise at 25° C., preferably less than about 30,000 centipoise at 25° C., and more preferably less than about 20,000 centipoise at 25° C. Higher viscosity resins are also useful, but often more solvating agents, such as organic solvents or crosslinkable olefinic compounds like (meth) acrylate monomers, will be needed. Unless otherwise noted herein, viscosity is measured using a Brookfield model DV-I Viscometer.

The allophanate-modified urethane resins of the present invention are particularly useful in making curable coating compositions. These coating compositions include the urethane resin and, optionally, a crosslinkable diluent which includes olefinic monomer material such as (meth)acrylate, allyl ether, or vinyl ether monomer material. A photoinitiator is typically included if the composition is to be capable of curing with UV or visible light. The curable coating composition may also include any of a number of other components, such as other urethane, epoxy, and/or polyester (meth)acrylate resins, an adhesion promoter, a defoamer, pigment, a solvent, a surface active agent, a filler, and/or an optical brightener. The curable coating compositions typically include at least about 20 wt. %, and preferably at least about 40 wt. %, of the allophanate-modified urethane resin. The relatively low viscosity of the present resins allow the formulation of coating compositions having at least about 75 wt. % of the allophanate-modified urethane resin.

The curable coating composition may include a crosslinkable diluent. The crosslinkable diluent typically includes olefinic monomer material for crosslinking with the allophanate-modified urethane resin and for decreasing the viscosity of the coating so that standard coating techniques and equipment can be used. One example of suitable olefinic monomer material is (meth)acrylate monomer material. Suitable (meth)acrylate monomers which may be employed have at least one (meth)acrylate functional group, e.g., acrylate and methacrylate compounds and functional derivatives thereof. Examples of (meth)acrylate monomer materials include mono-, di-, tri-, tetra- and pentafunctional (meth)acrylate materials typically having a molecular weight in the range of about 50 to about 750. Many such materials, including mono-, di-, tri-, tetra- and pentafunctional (meth)acrylate monomer materials, are described in P. K. T. Oldring "*Chemistry & Technology of UV & EB Formulation for Coatings, Inks & Paints*", Volume II, 1991,
SITA Technology. When the (meth)acrylate monomer material is used, it is typically about 10–70 wt. %, and preferably about 20–60 wt. %, of the coating composition.

The (meth)acrylate monomer material includes one or more different (meth)acrylate monomers, each monomer having one or more (meth)acrylate groups. The (meth) acrylate functional groups of the (meth)acrylate monomers are bonded to core structural groups which may be based on a wide variety of organic structures including tripropylene glycol, isobornyl alcohol, isodecyl alcohol, phenoxyethyl alcohol, trishydroxyethyl isocyanurate, trimethylolpropane ethoxylate, hexanediol, ethoxylated and propoxylated neopentyl glycol, oxyethylated phenol, polyethylene glycol, bisphenol ethoxylate, neopentyl glycol propoxylate, trimethylolpropane, propoxylated glycerol, pentaerythritol, tetrahydrofurfuryl alcohol, β-carboxyethyl alcohol, substituted derivatives of the above, combinations of the above, and the like.

One purpose of the (meth)acrylate monomer material is viscosity reduction of coating compositions that contain the allophanate-modified urethane resin. In addition, (meth) acrylate monomers may confer or enhance desirable characteristics, such as chemical resistance and hardness to the coating composition. It is thought that the presence of several (meth)acrylate groups on each substituent of the monomer results in multiple interactions between each monomer and resin molecule in the cured composition. These multiple interactions can result in increased chemical resistance, abrasion resistance, and/or hardness.

Examples of suitable (meth)acrylate monomers include isobornyl acrylate, isodecyl acrylate, phenoxyethyl acrylate, trimethylolpropane triacrylate, trimethylolpropane ethoxylate triacrylate, tripropylene glycol diacrylate, hexanediol diacrylate, tetrahydrofurfuryl acrylate, β-carboxyethyl acrylate, bisphenol A ethoxylate diacrylate, and ethoxylated and propoxylated neopentyl glycol diacrylates.

Another example of a suitable olefinic monomer material which may be employed as a crosslinkable diluent is an allyl ether monomer material. The allyl ether monomer material includes one or more different allyl ether monomers, each monomer having one or more allyl ether groups. The allyl ether functional groups of the allyl ether monomers are bonded to a core structural group which is based on a wide variety of polyhydric alcohols. Suitable polyhydric alcohols include neopentyl glycol, trimethylolpropane, ethylene glycol, propylene glycol, butylene glycol, diethylene glycol, trimethylene glycol, triethylene glycol, trimethylolethane pentaerythritol, glycerol, diglycerol, 1,4-butanediol, 1,6 hexanediol, 1,4-cyclohexanedimethanol, and the like.

Examples of suitable allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether pentaerythritol monoallyl ether, pentaerythritol diallyl ether pentaerythritol triallyl ether, 1,2,6-hexanetriol monoally ether, 1,2,6-hexanetriol diallyl ether, and the like. Propoxy lated and ethoxylated forms of these compounds are als suitable.

Another example of a suitable olefinic monomer materia is vinyl ether monomer material. The vinyl ether monome material includes one or more different vinyl ethe monomers, each monomer having one or more vinyl ethe groups. Examples of suitable vinyl ether monomers includ 4-hydroxybutyl vinyl ether, 1,4-cyclohexanedimethano monovinyl ether, 1,4-cyclohexanedimethanol divinyl ethe ethylene glycol monovinyl ether, ethylene glycol diviny ether, diethylene glycol monovinyl ether, diethylene glycol divinyl ether, triethylene glycol divinyl ether, and the like. Propoxylated and ethoxylated forms of these compounds are also suitable.

The crosslinkable diluent may include a mixture of (meth) acrylate, allyl ether, and vinyl ether monomer materials. In addition, the crosslinkable diluent can be supplemented by addition of other olefinic monomer materials. Such monomer materials include functional materials such as vinyl ether maleate monomers, and the like.

At least some of the coating compositions of the present invention, particularly those with (meth)acrylate functional groups, are curable by UV or visible light. These coating compositions typically include a photoinitiator that induces the curing reaction upon exposure to light. The photoinitiator typically generates free radicals in response to a particular wavelength range of light to initiate a free radical reaction that crosslinks the acrylate double bonds of the resin and (meth)acrylate monomer material, thereby curing the coating.

Among photoinitiators suitable for use in the present invention with resins having (meth)acrylate or allyl ether functional groups are α-cleavage type photoinitiators and hydrogen abstraction type photoinitiators. The photoinitiator makes up about 0.5–15 wt. % of the coating composition. The photoinitiator may include other agents such as a coinitiator or photoinitiator synergist that aid the photochemical initiation reaction.

Suitable cleavage type photoinitiators of the invention include. α,α-diethoxyacetophenone (DEAP); dimethoxyphenylacetophenone (Irgacure® 651); hydroxycyclohexylphenylketone (Irgacure® 184); 2-hydroxy-2-methyl-1-phenylpropan-1-one (Darocur® 1173); Irgacure® 1700, and Darocur® 4265 all from Ciba Corporation, Ardsley, N.Y. Irgacure® 1700 is a 25:75 blend of bis-(2,6-dimethoxybenzoyl)-2,4,4-trimethylpentyl phosphine oxide and 2-hydroxy-2-methyl-1-phenylpropan-1-one. Darocur® 4265 is a 50:50 blend of 2-hydroxy-2-methyl-1-phenylpropan-1-one and 2,4,6-trimethylbenzoyldiphenylphosphine oxide (TPO). Lucirin TPO photoinitiator (2,4,6-trimethylbenzoyldiphenylphosphine oxide) of BASF Corporation and KIP®100 photoinitiator (a mixture of 70% oligo |2-hydroxy-2-methyl-|4-(1-methylvinyl)phenyl|propan-1-one| and 30% 2-hydroxy-2-methyl-1-phenylpropan-1-one) available from Sartomer (Exton, Pa.) are also preferred.

Suitable hydrogen abstraction-type photoinitiators include benzophenone, substituted benzophenones (e.g., Escacure® TZT of Fratelli-Lamberti) and other diaryl ketone such as xanthones, thioxanthones, Michler's ketone, benzil, quinones, and substituted derivatives of all of the above.

Irgacure® 500 is a mixture of Irgacure® 184 and benzophenone, in a 1:1 ratio, and is a good example of a mixture of an α-cleavage type photoinitiator and a hydrogen abstraction-type photoinitiator. Other mixtures of photoinitiators may also be used in the coating composition. Preferred photoinitiators include Darocur® 1173, KIP® 100, benzophenone, and Irgacure® 184. Camphorquinone is one example of a suitable photoinitiator for curing a coating composition with visible light.

The present coating composition may also include a coinitiator or photoinitiator synergist. The coinitiators can be (1) tertiary aliphatic amines like methyl diethanol amine and triethanol amine; (2) aromatic amines like amylparadimethylaminobenzoate, 2-n-butoxyethyl-4-(dimethylamino) benzoate, 2-(dimethylamino) ethylbenzoate, ethyl-4-(dimethylamino)benzoate, and 2-ethylhexyl-4-(dimethylamino)benzoate; (3) (meth) acrylated amines like Ebecryl® 7100 and Uvecryl® P104 and P115, all from UCB RadCure Specialties; and (4) amino-functional acrylate or methacrylate resin or oligomer blends such as Ebecryl® 3600 or Ebecryl® 3703, both from UCB RadCure Specialties. Combinations of the above four categories of amines may also be used.

Coating compositions having allophanate-modified resins with vinyl ether functional groups can be cured by UV or visible light using cationic-generating photoinitiators. Examples of suitable cationic-generating photoinitiators include super acid-generating photoinitiators, such as triarylsulfonium salts. One useful triarylsulfonium salt is triphenyl sulfonium hexafluorophosphate, $Ph_3S^+PF_6^-$ (available from Union Carbide as UVI® 6990).

Many coating compositions which may be cured by UV or visible light may also be cured with an electron beam. Techniques and devices for curing a coating composition using an electron beam are known in the art. These techniques do not require a photoinitiator for electron beam cure of the coating.

Coating compositions having allophanate-modified urethane resins with (meth)acrylate and/or allyl functional groups may also be thermally cured using a suitable initiator. The thermal initiator typically facilitates the curing process by a free radical mechanism and typically includes a peroxide or azo compound. Peroxide compounds suitable for use as initiators the coating compositions include t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide, and di-(2-ethylhexyl)-peroxydicarbonate. Suitable azo compounds which may be employed as an initiator in the present compositions include 2,2-azo bis-(2,4-dimethylpentanenitrile), 2,2-azo bis-(2-methylbutanenitrile), and 2,2-azo bis-(2-methylpropanenitrile). In one embodiment of the invention, methyl ethyl ketone peroxide is employed as the curing agent (available as a solution of methyl ethyl ketone peroxide in dimethyl phthalate sold under the name Iuprasol DDM-9 by Ato-Chem). Preferably, the curing agent includes t-butyl perbenzoate, methyl ethyl ketone peroxide, and/or cumene hydroperoxide.

For coating compositions having an allophanate-modified urethane resin with a mixture of (meth)acrylate, allyl ether, and vinyl ether functional groups, a combination of curing procedures may be used. For example, a coating composition having an allophanate-modified urethane resin with both (meth)acrylate and vinyl ether functional groups typically includes an α-cleavage type and/or hydrogen abstraction type photoinitiator for the (meth)acrylate groups and a cationic-generating photoinitiator for the vinyl ether groups.

Other methods for curing the coating compositions of the invention can be used alone or in combination with methods described hereinabove. Supplemental curing methods include heat cure, chemical cure, anaerobic cure, moisture cure, oxidative cure, and the like. Each method of cure requires a corresponding curing initiator or curing agent, which is included in the composition. For example: heat cure can be induced by peroxides; metal drier packages can induce an oxidative cure; multifunctional amines (for example isophorone diamine) can effect a chemical crosslinking cure through Michael addition of amine groups onto acrylate reactive unsaturated groups. If these additional initiators are present in the coating composition they typically make up about 0.1–12% by weight of the curable coating composition. Means for effecting cures by such methods are known to those of skill in the art or can be determined using standard methods.

Another optional additive is an adhesion promoter for coatings which must exhibit sufficient adhesion to the substrate to form a cured coating of a required durability. The adhesion promoter may include an acid functional material, such as a (meth)acrylated acidic adhesion promoter. Exemplary (meth)acrylated acidic adhesion promoters include a (meth)acrylate ester of a hydroxyalkyl phosphoric acid ester. Other examples of suitable acid functional materials include β-carboxyethyl acrylate, acrylic acid, and Joncryl® 678 acid functional acrylic resin (S.C. Johnson Company).

Silane functional materials may also be utilized as adhesion promoters in this invention. Suitable examples include A-174 acrylate functional silane, A-189 mercapto functional silane and A-1100 amino functional silane (all available from OSI Specialties) and glycidoxypropyl-trimethoxysilanes (e.g., Z-6040 from Dow Corning Corporation). Titanate and zirconate adhesion promoters are among other adhesion promoters known to those skilled in the art which may also be employed in the present coating composition.

The curable coating composition may also include one of a group of ingredients that can be called performance enhancing additives. The coating composition may contain more than one performance enhancing additive. Typical performance enhancing additives which may be employed in the curable coating composition include a surface active agent, a pigment, a curing indicator, a filler, and an optical brightener.

The curable coating composition may include a surface active agent which modifies the interaction of the curable coating composition with the substrate, in particular, the agent can modify the ability of the composition to wet a substrate. Surface active agents may have other properties as well. For example, surface active agents may also include leveling, defoaming, or flow agents, and the like. The surface active agent affects qualities of the curable coating composition including how the coating composition is handled, how it spreads across the surface of the substrate, and how it bonds to the substrate. The surface active agent may make up about 0.1-3% by weight of the curable coating composition. Surface active agents suitable for use in coating compositions are known to those of skill in the art or can be determined using standard methods. Exemplary surface active agents include polydimethylsiloxane surface active agents (e.g., Silwet® L-7602, Silwet® L-7622; OSI Specialties or Byk® 306, Byk-Chemie) and fluorinated surface active agents (e.g., Fluorad® FC-430; 3M Company). The surface active agents may include a defoamer. Suitable defoamers include polysiloxane defoamers, such as a methylalkylpolysiloxane like Byk® 077 or Byk® 500 (Byk-Chemie), or polymeric defoamers (e.g., Byk® 051; Byk-Chemie).

For some applications, a coating which is opaque, colored, pigmented or has other visual characteristics is desired. Agents to provide such properties are also included in the invention. The composition can also include a gloss control additive or an optical brightener, such as Uvitex® OB, from Ciba-Geigy.

In certain instances it is advantageous to include fillers or inert ingredients in the coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Suitable fillers are known to those of skill in the art or can be determined using standard methods. Fillers or inert ingredients can make up from about 0.1-40% by weight of the coating composition.

The invention may also include other ingredients which modify properties of the curable coating composition as it is stored, handled, or applied, and at other or subsequent stages. Waxes, flatting agents, mar and abrasion additives, and other similar performance enhancing additives may be employed in this invention as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

The coatings may be applied to a variety of substrates including wood, cement, tile, metal, plastic, glass, optical fibers, and fiberglass. Coating compositions with allophanate-modified urethane resins can be applied to a substrate by a variety of methods known to those skilled in the art. Such methods include spraying, painting, rollcoating, spreading, air knife coating, die-coating, vacuum coating, spin coating, and dipping. The thickness of the coatings will vary with the application. Typically, the coatings will have a thickness of 0.1 to 20 mils, however, thicker or thinner coatings are also contemplated depending on, for example, the desired coating properties.

EXAMPLES

The following examples provide illustrations of embodiments of the invention. By no means are these examples designed to be all-inclusive or to limit the invention Furthermore, any specified use of the resins and coatings particularly in conjunction with coating a specific type of material, as described in these Examples is not intended to limit those resins or coatings to that specific use.

Comparative Example

Preparation of a urethane acrylate resin using dicaprolactone 2-(acryloyloxy)ethyl ester and an isocyanurate 36.137 parts Desmodur N-3300 isocyanurate (Baye Corporation) was heated in a reaction in a reaction flask to 60° C. under agitation. A mixture of 63.747 parts dicaprolactone 2-(acryloyloxy)ethyl ester, 0.048 parts methoxyphenol aerobic inhibitor and 0.048 parts dibutyl tin dilaurat catalyst (Air Products) was added to the reaction flask ove 75 minutes. An exotherm was observed during the addition and the resulting exotherm temperature was kept below 70 C. Upon complete addition of the mixture, 0.010 part methoxyphenol was added and the reaction temperatur increased to 85° C. The reaction was held at 85° C. fo approximately 1.5 hours until the free isocyanate leve reached <0.1% as determined by titration. The temperatur was lowered to 75° C. and 0.010 parts methoxyphenc added. The resulting urethane acrylate resin was held at 75 C. for 0.5 hours before filtration through a small mesh con filter. Resin viscosity was 55,000 centipoise at 25° C.

Example 1

Preparation of an allophanate-modified urethane acrylat resin using dicaprolactone 2-(acryloyloxy)ethyl ester and a allophanate-modified isocyanurate 37.310 parts Desmodur XP-7100 allophanate-modifie isocyanurate (Bayer Corporation) was heated in a reactio flask to 60° C. under agitation. A mixture of 62.600 par dicaprolactone 2-(acryloyloxy)ethyl ester, 0.024 parts metl oxyphenol aerobic inhibitor and 0.051 parts dibutyl tin dilaurate catalyst (Air Products) was added to the reaction flask over 75 minutes. An exotherm was observed during the addition, and the resulting exotherm temperature was kept below 70° C. Upon complete addition of the mixture, 0.005 parts methoxyphenol was added and the reaction temperature increased to 85° C. The reaction was held at 85° C. for approximately 1.5 hours until the free isocyanate level reached <0.1% as determined by titration. The temperature was lowered to 75° C. and 0.010 parts methoxyphenol added. The resulting allophanate-modified urethane acrylate resin was held at 75° C. for 0.5 hours before filtration through a small mesh cone filter. Resin viscosity was 18,000 centipoise at 25° C.

Example 2

Preparation of an allophanate-modified urethane acrylate resin using caprolactone 2-(acryloyloxy)ethyl ester and an allophanate-modified isocyanurate 47.030 parts Desmodur XP-7100 allophanate-modified isocyanurate (Bayer Corporation) was heated in a reaction flask to 60° C. under agitation. A mixture of 52.768 parts caprolactone 2-(acryloyloxy)ethyl ester, 0.118 parts methoxyphenol aerobic inhibitor and 0.049 parts dibutyl tin dilaurate catalyst (Air Products) was added to the reaction flask over 75 minutes. An exotherm was observed during the addition, and the resulting exotherm temperature was kept below 70° C. Upon complete addition of the mixture, the reaction temperature was increased to 85° C. and held for approximately 1.5 hours until the free isocyanate level reached <0.1% as determined by titration. The temperature was lowered to 75° C. and 0.035 parts methoxyphenol added. The resulting allophanate-modified urethane acrylate resin was held at 75° C. for 0.5 hours before filtration. Resin viscosity was 30,000 centipoise at 25° C.

Example 3

Preparation of an allophanate-modified urethane acrylate resin using 2-hydroxyethyl acrylate and an allophanate-modified isocyanurate 77.310 parts Desmodur XP-7100 allophanate-modified isocyanurate (Bayer Corporation) was heated in a reaction flask to 60° C. under agitation. A mixture of 22.420 parts 2-hydroxyethyl acrylate, 0.193 parts methoxyphenol aerobic inhibitor and 0.077 parts dibutyl tin dilaurate catalyst (Air Products) was added to the reaction flask over 75 minutes. An exotherm was observed during the addition, and the resulting exotherm temperature was kept below 70° C. Upon complete addition of the mixture, the reaction temperature was increased to 85° C. and held for approximately 1.5 hours until the free isocyanate level reached <0.1%. The temperature was lowered to 75° C. and the resulting allophanate-modified urethane acrylate resin was filtered. Resin viscosity was 52,000 centipoise at 25° C.

Example 4

Preparation of an allophanate-modified urethane acrylate resin using caprolactone 2-(acryloyloxy)ethyl ester and an allophanate-modified isocyanurate 48.764 parts Desmodur XP-7040 allophanate modified isocyanurate (Bayer Corporation) was heated in a reaction flask to 60° C. under agitation. A mixture of 50.984 parts caprolactone 2-(acryloyloxy)ethyl ester, 0.162 parts methoxyphenol aerobic inhibitor and 0.052 parts dibutyl tin dilaurate catalyst (Air Products) was added over 75 minutes. An exotherm was observed during the addition, and the resulting exotherm temperature was kept below 70° C. Upon complete addition of the mixture, 0.019 parts methoxyphenol was added and the reaction temperature increased to 85° C. The reaction is held at 85° C. for approximately 1.5 hours until the free isocyanate level reached <0.1%. The temperature was lowered to 75° C. and 0.019 parts methoxyphenol added. The resulting allophanate-modified urethane acrylate resin was held at 75° C. for 0.5 hours before filtration. Resin viscosity was 17,000 centipoise at 25° C.

Example 5

Preparation of an allophanate-modified urethane acrylate resin using dicaprolactone 2-(acryloyloxy)ethyl ester and an allophanate-modified isocyanurate 38.980 parts Desmodur XP-7040 allophanate-modified isocyanurate (Bayer Corporation) was heated in a reaction flask to 60° C. under agitation. A mixture of 60.904 parts dicaprolactone 2-(acryloyloxy)ethyl ester, 0.048 parts methoxyphenol aerobic inhibitor and 0.048 parts dibutyl tin dilaurate catalyst (Air Products) was added to the reaction flask over 75 minutes. An exotherm was observed during the addition, and the resulting exotherm temperature was kept below 70° C. Upon complete addition of the mixture, 0.010 parts methoxyphenol was added and the reaction temperature increased to 85° C. The reaction was held at 85° C. for approximately 1.5 hours until the free isocyanate level reached <0.1% as determined by titration. The temperature was lowered to 75° C. and 0.010 parts methoxyphenol added. The resulting allophanate-modified urethane acrylate resin was held at 75° C. for 0.5 hours before filtration through a small mesh cone filter. Resin viscosity was 12,000 centipoise at 25° C.

Example 6

Comparison of the viscosity of the urethane acrylate resins of the Comparative Example and Examples 1 and 5

Table 1 provides a comparison of the viscosities of the urethane acrylate resins of the Comparative Example with the allophanate-modified urethane acrylate resins of Examples 1 and 5. All three resins were synthesized by reaction of an isocyanurate with dicaprolactone 2-(acryloyloxy)ethyl ester.

TABLE 1

Comparison of Room-Temperature Viscosity (in cps) of the Urethane Acrylate Resins of the Comparative Example and Examples 1 and 5

| Urethane Acrylate Resin | Viscosity at 25° C. | Viscosity at 25° C. after 3 weeks at 140° F. | Methoxyphenol Inhibitor Level |
|---|---|---|---|
| Comparative Example | 55,000 | 55,000 | 675 ppm |
| Example 1 | 18,000 | 18,000 | 400 ppm |
| Example 5 | 12,000 | 12,000 | 675 ppm |

Table 1 illustrates the profound effect that allophanation of the isocyanurate has on the resin viscosity. The allophanate-modified resins have more than a threefold decrease in viscosity as compared to the unmodified resin.

Example 7

Preparation of a vinyl tile coating composition containing the allophanate-modified urethane acrylate resin of Example 1

A coating composition was formulated using the components and weight percentages shown in Table 2. An additional resin Ebycryl 264 (UCB Radcure Specialties), a urethane triacrylate resin, was provided in the coating composition to enhance the desired properties.

TABLE 2

Vinyl Tile Coating Composition

| Components | Weight Percent |
| --- | --- |
| Allophanate-Modified Urethane Acrylate of Example 1 | 57.0 |
| Ebecryl ® 264 | 20.0 |
| Hexanediol Diacrylate | 15.4 |
| Isodecyl Acrylate | 5.0 |
| Irgacure ® 184 | 1.5 |
| Byk ®-500 | 1.0 |
| L-7602 | 0.1 |
| TOTAL | 100.0 |

The vinyl tile coating composition had a viscosity of 3,000 centipoise at 25° C. and a surface tension of 32.5 dynes. The low viscosity of the allophanate-modified urethane acrylate resin of Example 1, permitted a high loading of resin in this UV curable coating composition, while still maintaining a low application viscosity. The multi-acrylate functionality (approximately 2.8) of the resin, in combination with the high resin load provided a composition capable of being cured into a coating having superior abrasion resistance.

The coating was deposited on a vinyl tile substrate at a film thickness of 5.0 mil and ultraviolet cured with 2× 300 watt/inch medium pressure mercury lamps at a line speed of 120 feet per minute under a nitrogen atmosphere.

The coating had good stain resistance. Stain resistance testing was performed by application of various staining agents, used by the industry for such testing, over the coating composition. After one hour, the staining agents were removed and graded on a 0–4 scale (0 indicates no stain and 4 indicates very heavy stain). The results are shown in Table 3.

TABLE 3

Stain Resistance

| Staining Agent | Grade (one hour) |
| --- | --- |
| Shoe Polish | 1.5 |
| Mustard | 1.0 |
| Chem Lawn | 1.0 |
| Iodine | 3.0 |
| Blue Sharpie (ink) | 1.0 |
| Coal Tar A | 0.5 |
| Coal Tar B | 0.5 |
| Total Stain Grade: | 8.5 |

Gloss retention measurements were performed on a Byk Gardner gloss meter at 60 degrees according to the ASTM D-2486 (06.02) scrub testing protocol. The scrub testing was performed using a 10% Ajax solution as the abrasive. After 150 cycles, the gloss retention was 92%, after 300 cycles gloss retention was 80%. Because gloss will decrease as the surface is scratched, these results indicate good abrasion resistance.

Example 8
Preparation of a metal coating composition containing the allophanate-modified urethane acrylate resin of Example 4 and comparison with other coating compositions An ultraviolet air-cured coating using the allophanate-modified urethane acrylate of Example 4 was developed to attain adhesion, hardness and flexibility on a brass substrate. The multi-functionality of allophanate-modified urethane resins combined with low viscosities allowed a high loading of resin in the coating composition. This resulted in improved physical properties such as hardness combined with flexibility. The components of the coating are shown in Table 4. The components of three comparison coatings made using commercially available materials are also listed in Table 4.

TABLE 4

Metal Coating Compositions

| Components | Coating 8A | Coating 8B | Coating 8C | Coating 8D |
| --- | --- | --- | --- | --- |
| Allophanated Urethane Acrylate of Example 4 | 52.0 | | | |
| Ebecryl ® 264 | | 62.9 | | |
| Tris (2-hydroxy-ethyl) isocyanurate Triacrylate | | | 49.0 | |
| Ebecryl ® 4883 | | | | 7.1 |
| Ebecryl ® 8402 | | | | 27.4 |
| Bisphenol A Ethoxylate Diacrylate (M. W. = 512) | 20.0 | 19.4 | | 27.4 |
| Isobornyl acrylate | 20.0 | 9.7 | 39.2 | 29.5 |
| Ebecryl 170 | 3.0 | 3.0 | 4.9 | 2.8 |
| KIP ® 100 | 3.0 | 3.0 | 2.0 | 2.8 |
| Benzophenone | 2.0 | 2.0 | 2.0 | 2.8 |
| Methyldiethyl amine | | | 2.9 | |
| L-7602 | | | | 0.2 |
| TOTAL | 100.0 | 100.0 | 100.0 | 100.0 |

Coatings 8B and 8C were made using tri-functional acrylate resins, Ebecryl® 264 (UCB Radcure Specialties) and tris(2-hydroxy-ethyl)isocyanurate triacrylate (Sartomer), respectively. Coating 8D included a mixture of two di-functional urethane acrylate resins, Ebecryl® 4883 and Ebecryl® 8402 (UCB Radcure Specialties). Ebecryl® 170 (UCB Radcure Specialties) is an acrylate ester of a hydroxyalkyl phosphoric acid ester Physical characteristics of the four coating compositions were tested. All four coatings were applied at 0.5 mil thickness to a brass panel and ultraviolet cured with 2×500 watt/inch medium pressure mercury lamps at a line speed of 40 feet per minute under an ambient atmosphere. Results of the tests are presented in Table 5. Once a coating failed a test, no further tests were run on that coating.

TABLE 5

Testing of Physical Characteristics

| Physical Test | Coating 8A | Coating 8B | Coating 8C | Coating 8D |
| --- | --- | --- | --- | --- |
| Adhesion Test | 100% | 100% | Fail | 100% |
| Blocking Test | Pass | Fail | | Fail |
| Pencil Hardness | 3H | | | |
| Reverse Impact Test | 100 in. lbs. | | | |
| T-Bend | 0 T | | | |

The first test was an adhesion test. Tape (Cross Hatcl #600 Tape, 3M, St. Paul, Minn.) was applied over th coating. The tape was pulled away manually and the coatin and the tape were inspected to determine whether an portion of the coating had been pulled away. Coatings 8A 8B, and 8D passed this test. A portion of Coating 8C wa pulled off the metal surface. No further tests were performe on Coating 8C.

The second test was the "Blocking" Test. Two coated surfaces were pressed together with embossed tissue paper between them. A 300 psi force was applied for 24 hours at a temperature of 160° F. to test the hardness of the coatings. After the 24 hour period, the coatings were examined to determine whether any impressions from the embossed paper had been imprinted on the coating surfaces. Existence of such impressions on Coatings 8B and 8D indicated failure. No further testing was performed on these coatings. Coating 8A, the coating derived from the allophanate-modified urethane resin, showed substantially no imprint and passed the test.

The hardness of Coating 8A was tested and determined to be approximately 3H on the pencil hardness scale.

The next two tests were the Reverse Impact test, following the protocol found in ASTM G-14-88 (except that flat brass panels were used instead of a steel pipe), and the T-bend test, following the protocol found in ASTM D4145-85. The purpose of these tests is to determine the flexibility and adhesion of the coating as the coating flexes when deformed. Often coatings will lose adhesion to the substrate surface when they are flexed, however, the results for Coating 8A show excellent flexibility and adhesion.

Example 9

Preparation of a polycarbonate coating composition containing the allophanate-modified urethane acrylate resins of Examples 1 and 2

A series of UV air-cured coatings were developed to attain adhesion, hardness and abrasion resistance over polycarbonate substrate. UV curable coatings on polycarbonate are widely utilized for automotive headlamp lenses and exterior signs Due to the multi-acrylate functionality, low viscosity and high resin levels of the allophanate modified urethane acrylate resins in ultraviolet curable coatings, improved physical properties such as hardness combined with abrasion resistance can be obtained. The following specific examples, found in Table 6, illustrate these advantages. The coatings were applied at 1.0 mil thickness onto a polycarbonate plaque from Bayer Corporation and UV cured in an air atmosphere with 2×300 watt/inch medium pressure mercury lamps at a line speed of 40 feet per minute.

TABLE 6

Polycarbonate Coating Compositions

| Components | Coating 9A | Coating 9B |
| --- | --- | --- |
| Allophanate-Modified Urethane Acrylate of Example 1 | 54.7 | |
| Allophanate-Modified Urethane Acrylate of Example 2 | | 45.6 |
| Hexanediol Diacrylate | 38.7 | 47.8 |
| KIP ®-100 | 5.9 | 5.9 |
| BYK ®-306 | 0.7 | 0.7 |
| TOTAL | 100.0 | 100.0 |

Table 7 shows the results of tests carried out on the coatings. The adhesion test is described in Example 8.

TABLE 7

Testing of Physical Characteristics

| Physical Test | Coating 9A | Coating 9B |
| --- | --- | --- |
| Adhesion Test | 100% | 100% |
| MEK 2x Rub Test | >100 | >100 |
| Steel Wool Rub Test | Pass | Pass |

TABLE 7-continued

Testing of Physical Characteristics

| Physical Test | Coating 9A | Coating 9B |
| --- | --- | --- |
| Heat Resistance | No Cracks 100% adhesion | No Cracks 100% adhesion |
| Water Soak (350 hours) | No Delamination 100% adhesion | No Delamination 100% adhesion |

The MEK 2X Rub test is performed by rubbing a coated surface with a methyl ethyl ketone applied on a hard material, such as the head of hammer. The ketone is rubbed back and forth for a specified number of times and then the coating is checked for marring caused by the solvent interacting with and removing portions of the coating.

In the Steel Wool Rub Test, #0000 steel wool is rubbed ten times across the coating. The coating is then visually inspected to determine the amount of scratching. Passing indicates that there were no visible scratches.

The heat resistance of the coating is tested by heating the coating at 120° C. for two hours. The coating is then checked for cracking. The Adhesion Test is performed to determine the adhesion of the coating to the substrate after heating. Both Coatings 9A and 9B showed no cracking and no loss of adhesion to the polycarbonate substrate.

The Water Soak test is performed by submerging the coated polycarbonate surface in room-temperature water for 350 hours. The Adhesion Test is then used to determine the adhesion of the coating to the substrate. Both coatings showed no loss of adhesion or delamination.

Example 10

Preparation of an allophanate-modified urethane resin using a propoxylated allyl alcohol and an allophanate-modified isocyanurate An allophanate-modified urethane resin can be made by reacting 39 parts Desmodur XP-7040 allophanate-modified isocyanurate (Bayer Corporation) with 61 parts of a propoxylated allyl alcohol, $CH_2=CH-CH_2-O-(CH_2-CH(CH_3)-O)_5-H$. The allophanate-modified isocyanurate is heated in a reaction flask to 60° C. under agitation. A mixture containing the propoxylated allyl alcohol, 0.025 parts methoxyphenol aerobic inhibitor and 0.06 parts dibutyl tin dilaurate catalyst (Air Products) is added to the reaction flask over 75 minutes. An exotherm is observed during the addition, and the resulting exotherm temperature is kept below 70° C. Upon complete addition of the mixture, 0.005 parts methoxyphenol is added and the reaction temperature is increased to 85° C. The reaction is held at 85° C. for approximately 1.5 hours until the free isocyanate level reaches <0.1as determined by titration. The temperature is lowered to 75° C. and 0.01 parts methoxyphenol added. The resulting allophanate-modified urethane resin is held at 75° C. for 0.5 hours before filtration through a small mesh cone filter.

Example 11

Preparation of an allophanate-modified urethane resin using 4-hydroxybutyl vinyl ether and an allophanate-modified isocyanurate An allophanate-modified urethane resin can be made by reacting 67 parts Desmodur XP-7040 allophanate-modified isocyanurate (Bayer Corporation) with 33 parts 4-hydroxybutyl vinyl ether ($CH_2=CH-O-(CH_2)_4-OH$). The allophanate-modified isocyanurate is heated in a reaction flask to 60° C. under agitation. A mixture containing the 4-hydroxybutyl vinyl ether, 0.025 parts methoxyphenol aerobic inhibitor and 0.060 parts dibutyl tin dilaurate catalyst (Air Products) is added to the reaction flask over 75 minutes. An exotherm is observed during the addition, and the resulting exotherm temperature is kept below 70° C. Upon complete addition of the mixture, 0.005 parts methoxyphenol is added and the reaction temperature is increased to 85° C. The reaction is held at 85° C. for approximately 1.5 hours until the free isocyanate level reaches <0.1% as determined by titration. The temperature is lowered to 75° C. and 0.01 parts methoxyphenol added. The resulting allophanate-modified urethane resin is held at 75° C. for 0.5 hours before filtration through a small mesh cone filter.

All publications and patent applications in this specification are indicative of the level of ordinary skill in the art to which this invention pertains. All publications and patent applications are herein incorporated by reference to the same extent as if each individual publication or patent application was specifically and individually incorporated by reference.

We claim:

1. A resin comprising an allophanate-modified urethane resin having the formula:

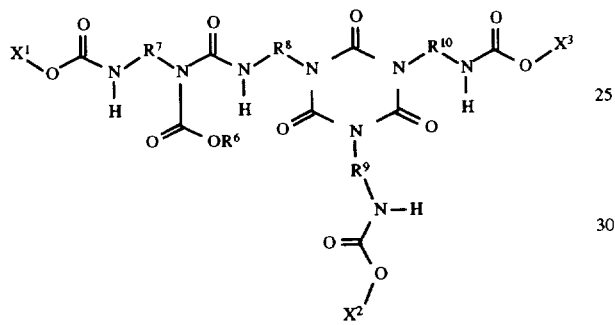

wherein $X^1$, $X^2$, $X^3$ are independently —$(R^1$—$O)_n$—$R^2$—$(O$—$R^3)_p$, —$(R^4$—$C(O)$—$O)_m$—$R^5$—$(O$—$R^{11})_r$, or —$CH_2$—$C(R^{12})$=$CHR^{13}$;

$R^1$, $R^2$, $R^4$, and $R^5$ are independently C2–C12 alkylene; $R^3$ and $R^{11}$ are independently —$C(R^{14})$=$CHR^{15}$, —$CH_2$—$C(R^{16})$=$CHR^{17}$, or —$C(O)$—$C(R^{18})$=$CHR^{19}$;

$R^6$ is C1–C8 alkyl or C3–C8 cycloalkyl;

$R^7$, $R^8$, $R^9$, and $R^{10}$ are independently C2–C12 alkylene; $R^{12}$, $R^{13}$, $R^{14}$, $R^{15}$, $R^{16}$, $R^{17}$, $R^{18}$, and $R^{19}$ are independently H or C1–C4 alkyl;

n is an integer from 0 to 12;

m is an integer from 1 to 4;

p is an integer from 1 to 3; and r is an integer from 1 to 3.

2. The resin of claim 1, wherein $R^{12}$, $R^{14}$, $R^{16}$, and $R^{18}$ are H or $CH_3$ and $R^{13}$, $R^{15}$, $R^{17}$, and $R^{19}$ are H.

3. The resin of claim 1, wherein $X^1$, $X^2$, and $X^3$ are independently —$(R^1$—$O)_n$—$R^2$—$(O$—$R^3)_p$ or —$(R^4$—$C(O)$—$O)_m$—$R^5$—$(O$—$R^{11})_r$.

4. The resin of claim 3, wherein $R^3$ and $R^{11}$ are independently —$C(R^{14})$=$CHR^{15}$.

5. The resin of claim 3, wherein $R^3$ and $R^{11}$ are independently —$CH_2$—$C(R^{16})$=$CHR^{17}$.

6. The resin of claim 3, wherein $R^3$ and $R^{11}$ are independently —$C(O)$—$C(R^{18})$=$CHR^{19}$.

7. The resin of claim 6, wherein $X^1$, $X^2$, and $X^3$ are —$R^2$—$O$—$C(O)$—$C(R^{18})$=$CH_2$ and $R^{18}$ is H or $CH_3$.

8. The resin of claim 6, wherein $X^1$, $X^2$, and $X^3$ are —$((CH_2)_5$—$C(O)$—$O)_n$—$(CH_2)_2$—$O$—$C(O)$—$C(R^{18})$=$CHR^{19}$.

9. The resin of claim 8, wherein n is 1 or 2.

10. The resin of claim 3, wherein $R^2$ and $R^5$ are independently —$CH_2CH_2$—, —$CH_2CH_2CH_2$—, —$CH(CH_3)CH_2$—, or —$CH_2CH_2CH_2CH_2$—.

11. The resin of claim 1, wherein $X^1$, $X^2$, and $X^3$ are —$((CH_2)_5$—$C(O)$—$O)_2$—$(CH_2)_2$—$O$—$C(O)$—$CH$=$CH_2$ and $R^7$, $R^8$, $R^9$, and $R^{10}$ are —$(CH_2)_6$—.

12. The resin of claim 1, wherein the allophanate-modified urethane resin has a viscosity of less than about 40,000 centipoise.

13. The resin of claim 1, wherein the allophanate-modified urethane resin has a viscosity of less than about 20,000 centipoise.

14. The resin of claim 1, having, on average, greater than about 2.2 olefinic groups per allophanate-modified urethane molecule.

15. A resin made by a process comprising:

reacting an allophanate-modified isocyanurate comprising a compound having the formula:

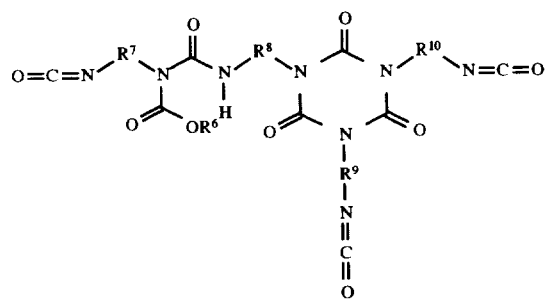

with a hydroxy-functional olefinic compound to obtain a reaction product comprising a compound having the formula:

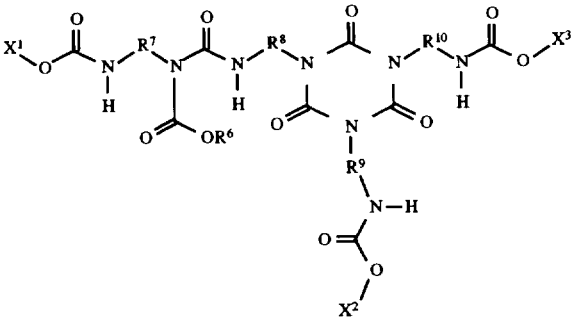

wherein $X^1$, $X^2$, $X^3$ are independently —$(R^1$—$O)_n$—$R^2$—$(O$—$R^3)_p$, —$(R^4$—$C(O)$—$O)_m$—$R^5$—$(O$—$R^{11})_r$, o —$CH_2$—$C(R^{12})$=$CHR^{13}$;

$R^1$, $R^2$, $R^4$, and $R^5$ are independently C2–C12 alkylene $R^3$ and $R^{11}$ are independently —$C(R^{14})$=$CHR^{15}$ —$CH_2$—$C(R^{16})$=$CHR^{17}$, or —$C(O)$—$C(R^{18})$=$CHR^{19}$;

$R^6$ is C1–C8 alkyl or C3–C8 cycloalkyl;

$R^7$, $R^8$, $R^9$, and $R^{10}$ are independently C2–C12 alkylene $R^{12}$, $R^{13}$, $R^{14}$, $R^{15}$, $R^{16}$, $R^{17}$, $R^{18}$, and $R^{19}$ are independently H or C1–C4 alkyl;

n is an integer from 0 to 12;

m is an integer from 1 to 4;

p is an integer from 1 to 3; and r is an integer from 1 to 3.

16. The resin of claim 15, wherein $X^1$, $X^2$, and $X^3$ are the same.

17. The resin of claim 15, wherein the equivalent ratio of allophanate-modified isocyanurate and hydroxy-functional olefinic compound is between about 0.9:1.0 and 1.1:1.0.

18. The resin of claim 15, wherein allophanate-modified isocyanurate has an average of greater than about 2.2 isocyanate groups per allophanate-modified isocyanurate molecule.

19. The resin of claim 18, wherein the allophanate-modified isocyanurate has an average of about 2.2 to about 3.2 isocyanate groups per allophanate-modified isocyanurate molecule.

20. The resin of claim 19, wherein the allophanate-modified isocyanurate has an average of at least about 2.6 isocyanate groups per allophanate-modified isocyanurate molecule.

21. A curable coating composition comprising:
an allophanate-modified urethane resin comprising a compound having the formula:

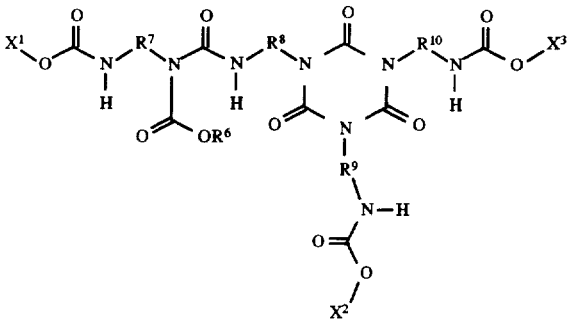

wherein $X^1$, $X^2$, $X^3$ are independently —$(R^1$—O$)_n$—$R^2$—(O—$R^3)_p$, —$(R^4$—C(O)—O$)_m$—$R^5$—(O—$R^{11})_r$, or —$CH_2$—C($R^{12}$)=CHR$^{13}$;

$R^1$, $R^2$, $R^4$, and $R^5$ are independently C2–C12 alkylene; $R^3$ and $R^{11}$ are independently —C($R^{14}$)=CHR$^{15}$, —$CH_2$—C($R^{16}$)=CHR$^{17}$, or —C(O)—C($R^{18}$)=CHR$^{19}$;

$R^6$ is C1–C8 alkyl or C3–C8 cycloalkyl;

$R^7$, $R^8$, $R^9$, and $R^{10}$ are independently C2–C12 alkylene; $R^{12}$, $R^{13}$, $R^{14}$, $R^{15}$, $R^{16}$, $R^{17}$, $R^{18}$, and $R^{19}$ are independently H or C1–C4 alkyl;

n is an integer from 0 to 12;

m is an integer from 1 to 4;

p is an integer from 1 to 3; and r is an integer from 1 to 3.

22. The curable coating composition of claim 21, wherein the composition further comprises (meth)acrylate monomer material.

23. The curable coating composition of claim 21, wherein $X^1$, $X^2$, and $X^3$ are independently —$(R^1$—O$)_n$—$R^2$—(O—$R^3)_p$ or —$(R^4$—C(O)—O$)_m$—$R^5$—(O—$R^{11})_p$ and the composition further comprises a photoinitiator.

24. The curable coating composition of claim 23, wherein $R^3$ and $R^{11}$ are independently —C(O)—C($R^{18}$)=CHR$^{19}$ or —$CH_2$—C($R^{16}$)=CHR$^{17}$ and the photoinitiator comprises an α-cleavage type photoinitiator, a hydrogen abstraction-type photoinitiator, or a mixture thereof.

25. The curable coating composition of claim 21, wherein $X^1$, $X^2$, and $X^3$ are —(($CH_2)_5$—C(O)—O$)_n$—$R^5$—O—C(O)—C($R^{18}$)=$CH_2$; $R^7$, $R^8$, $R^9$, and $R^{10}$ are —$(CH_2)_6$—; $R^5$ is C2–C3 alkylene; $R^{18}$ is H or $CH_3$; and n is 1 or 2.

26. A method of coating a surface of a substrate, comprising:

applying a curable coating composition to the surface of the substrate to form an uncured coated surface; and curing the uncured coated surface to produce a cured coating on the surface;

wherein the curable coating composition includes (meth)acrylate monomer material and an allophanate-modified urethane resin comprising a compound having the following formula:

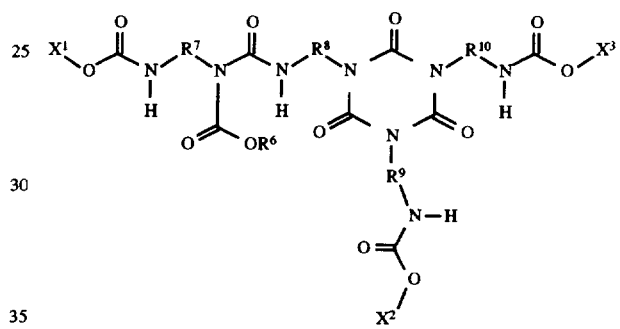

wherein $X^1$, $X^2$, $X^3$ are independently —$(R^1$—O$)_n$—$R^2$—(O—$R^3)_p$, —$(R^4$—C(O)—O$)_m$—$R^5$—(O—$R^{11})_r$, or —$CH_2$—C($R^{12}$)=CHR$^{13}$;

$R^1$, $R^2$, $R^4$, and $R^5$ are independently C2–C12 alkylene;

$R^3$ and $R^{11}$ are independently —C($R^{14}$)=CHR$^{15}$, —$CH_2$—C($R^{16}$)=CHR$^{17}$, or —C(O)—C ($R^{18}$)=CHR$^{19}$;

$R^6$ is C1–C8 alkyl or C3–C8 cycloalkyl;

$R^7$, $R^8$, $R^9$, and $R^{10}$ are independently C2–C12 alkylene;

$R^{12}$, $R^{13}$, $R^{14}$, $R^{15}$, $R^{16}$, $R^{17}$, $R^{18}$, and $R^{19}$ are independently H or C1–C4 alkyl;

n an integer from 0 to 12;

m an integer from 1 to 4;

p an integer from 1 to 3; and r an integer from 1 to 3.

27. The method of claim 26, wherein $R^3$ is —C(O)—C(CH$_3$)=CH$_2$ and $R^{11}$ is —C(O)—CH=CH$_2$.

* * * * *